INVENTOR.
WILLIAM A. SHEPPARD
BY Thomas W. Brennan

United States Patent Office 3,401,887
Patented Sept. 17, 1968

3,401,887
CONTROLLABLE ROCKET NOZZLE WITH PRESSURE AMPLIFIER FOR REDUCING ACTUATING FORCE
William A. Sheppard, Tucson, Ariz., assignor to Thiokol Chemical Corporation, Bristol, Pa., a corporation of Delaware
Filed May 2, 1966, Ser. No. 546,697
2 Claims. (Cl. 239—265.35)

ABSTRACT OF THE DISCLOSURE

A cantable nozzle for a rocket motor mounted in the aft end thereof. The nozzle is mounted in an aft end adaptor and has a pair of peripheral, radial projections terminating in spherical surfaces which contact similar surfaces on the adaptor. The adaptor and nozzle projections define an annular cavity which is pressurized by means of hydraulic fluid to balance the force imposed on the nozzle by the combustion gas pressure of the motor, thereby permitting angular movement of the nozzle under reduced actuation force requirement.

---

This invention relates to a device for controlling the direction of thrust produced by a rocket motor, and more particularly, to nozzles adaptable for use in such motors which are angularly movable with minimal friction and actuation force.

In the art of flying bodies, missiles and the like powered by rocket motors, in particular solid propellant motors, movable nozzles which are cantable in one or more planes of motion have long been used for thrust direction, or thrust vector, control. In general, such nozzles have been most frequently used in multiple arrangements because of high friction and high actuation requirements imposed in use in single nozzle devices. However, it has long been known that a single nozzle thrust vector control system is superior and affords many advantages, for instance, relative simplicity, lower inert weight, and actuation systems of considerably lesser complexity overall. Prior art devices of this nature have usually been based, in one manner or another, on the universal joint principle, or have utilized flexible and/or articulated nozzle systems. In general, most have proved unworkable in significant respects.

Accordingly, it is an important object of this invention to provide a single nozzle, cantable in any plane of motion, which is capable of controlling the thrust vector of a rocket motor in flight wherein friction forces are minimal, and actuation force requirements are substantially reduced.

It is another object of this invention to provide a rocket motor for a flying body having a nozzle of the character described which is mounted in the aft end of said motor on uniquely formed spherical bearings, and wherein chamber pressure gases are used to equalize to a substantial degree, the directional forces acting on the nozzle.

It is still another object of this invention to provide a rocket motor nozzle for controlling the direction of thrust wherein the nozzle and its mounting are uniquely joined to provide a lightweight, low friction, easily actuated cantable nozzle, and which is further characterized by the provision therefor of means substantially equalizing the directional forces applied thereto from the motor.

Figure 1:
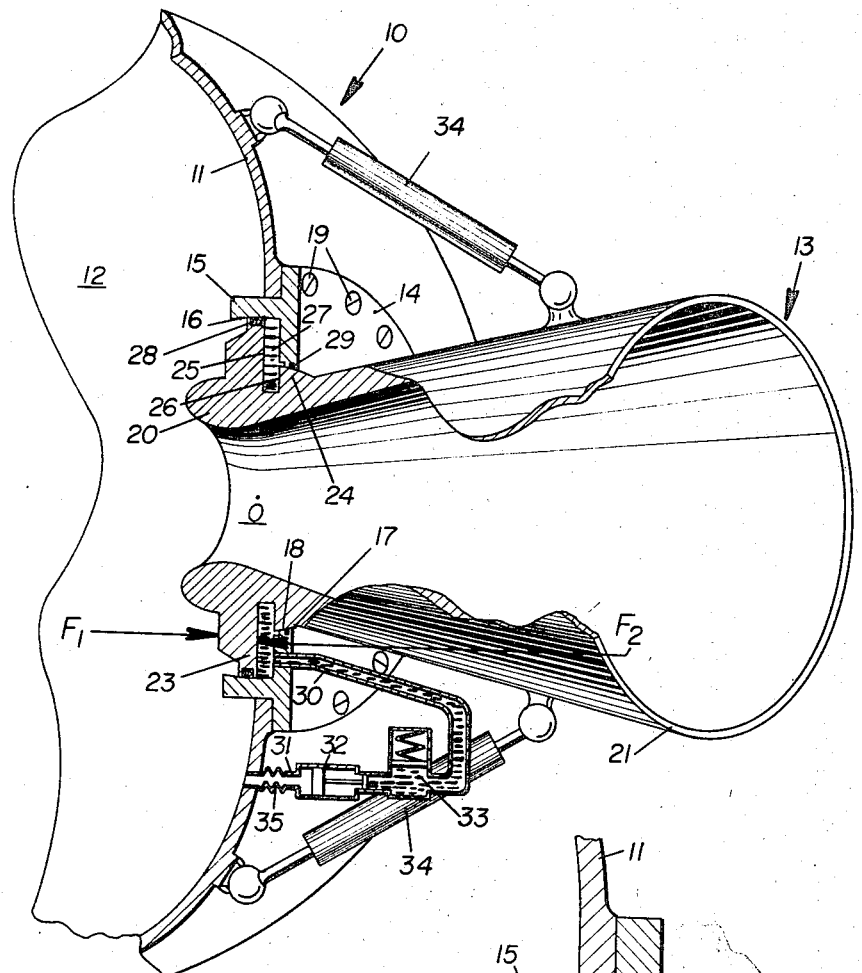
Figure 2:
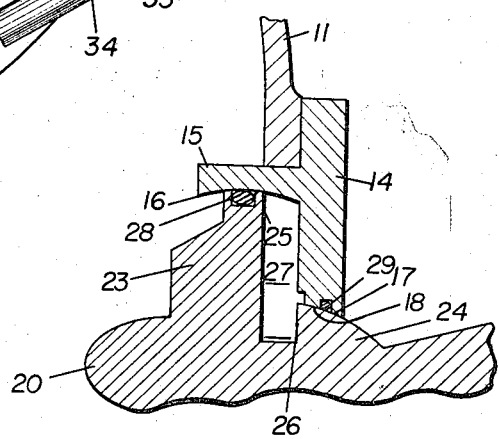

These and other objects and advantages of the present invention will become apparent from the following detailed description taken in conjunction with the accompanying drawings in which:

FIGURE 1 is a side elevational view, partially in section, of a rocket motor and nozzle embodying the invention; and, FIGURE 2 is a view of a portion of FIG. 1 illustrating in greater detail the spherical bearing surfaces of the invention.

Referring to the drawing, there is shown a rocket motor 10 comprising a casing 11 enclosing a combustion chamber 12 (partially shown), and a nozzle 13. Nozzle 13 is mounted in an aft end adaptor or mounting plate 14 comprising a forwardly projecting portion 15 having a bearing surface 16 of substantially spherical configuration with its center at O in FIG. 1. Plate 14 has a central perforation 17 which is formed with a spherical, inner, peripheral surface 18 whose center is, for reasons to become more apparent from what follows, also at O in FIG. 1. Surface 18 contains fluid seal 29, preferably of the O-ring type. Mounting, plate, or adaptor 14 is secured to casing 11 by the set screws 19, or other similar fasteners, well known to the art.

Nozzle 13 is constructed, as is usual in the art, with a converging-diverging throat 20 and an expansion cone 21 and extends forwardly into combustion chamber 12, being partially submerged therein. Nozzle 13 is supported by adaptor 14 in perforation 17 on surface 18 thereof and in projecting portion 15 on surface 16 thereof at the radial termini of the annular projections 23 and 24, which are movable over surfaces 16 and 18 respectively. Projections 23 and 24 include a pair of vertical walls or surfaces 25 and 26, and together with a portion of the forward side of adaptor 14 define a recess or chamber 27. The end surface of radial projection 24 is also spherical and is fitted with a fluid seal 28, preferably of the O-ring type.

Referring now to the bottom of FIG. 1, holes or openings provided in adaptor 14 and in casing 11, are adapted to receive a pair of conduits 30 and 31 respectively, whereby communication between chamber or recess 27, and combustion chamber 12 is established. A hydraulic pressure amplifier 32 and an accumulator 33 are positioned in line respectively in the conduits 30 and 31. Conduits 30 and 31 include flexible connectors or members 35 (one shown) to accommodate nozzle 13 during movement thereof. Connectors 35 can be installed anywhere in conduit 30 or 31, or at either or both ends thereof. Amplifier 32 is the usual differential piston type, well known to the art, and provision is made (not shown) for filling the conduit 30 between the smaller piston including accumulator 33, and the chamber 27 with an inert fluid, preferably hydraulic fluid.

A plurality of hydraulic or pneumatic actuators 34 (two shown for clarity) are connected at their opposite ends to casing 11 and expansion cone 21 for canting nozzle 13 and partially supporting it when in position of axial alignment with motor casing 11.

In operation of this invention, it should be noted that the primary stated purpose herein is to provide a single nozzle motor wherein thrust vector control is achieved by canting the nozzle in any desired plane of motion, thereby vectoring the thrust in an altered direction to achieve directional control of a missile propelled by the thrust developing motor. Further, that single nozzle thrust vectoring, in general, is not new, having been accomplished heretofore in the prior art. However, prior art devices have invariably been bulky, difficult to control and required high powered auxiliary actuation devices to effect the desired control. In operation herein, when motor 10 is started, and with nozzle 13 and casing 11 in axial alignment, a thrust is produced which acts in an axial, forward direction with respect to motor 10. An opposite, axial force $F_1$ is also exerted against nozzle 13 as designated in FIG. 1. Simultaneously, combustion gas at a pressure substantially equal to the motor chamber pressure enters conduit 31 and acts against pressure amplifier 32 at a large piston thereof and causes hydraulic fluid in conduit 30 accumulator 33 and chamber 27 to become pressurized producing a force $F_2$, as designated in FIG. 1, which acts against annular face or surface 25. By properly selecting the piston sizes in amplifier 32, $F_2$ is made equal and opposite to $F_1$ and proportional to the motor chamber pressure. It is, therefore, readily apparent that nozzle 13 cannot, under the conditions stated, be longitudinally displaced, and at the same time seated in surfaces 18 and 16 on a fluid (i.e., hydraulic) bearing under conditions of very low friction and requiring minimal actuating force for canting.

Further, since nozzle 13 is mounted in spherical seats or surfaces 16 and 18 of adaptor 14, and since all spherical surfaces have a common center O located on the motor longitudinal axis (and in the center of nozzle 13), it is relatively freely canted in any plane thereabout with minimal actuation torques required to be supplied by actuators 34. Hence, actuators 34 can be quite small and of quite simple construction.

It is readily seen, therefore, that what has been presented to the art of thrust vector control in rocket motor technology, is an improved, single nozzle motor, wherein substantial reduction in the actuation and control system weight, bulkiness and complexity has been achieved. Therefore, what is desired to be protected by Letters Patent of the United States of America is not to be unduly limited since many modifications and departures from the embodiment shown can be made by one skilled in this art without departing from its spirit or scope, except as set forth in the subtended claims.

What is claimed is:

1. A solid propellant rocket motor having a cantable nozzle for changing the direction of thrust produced by the combustion gases discharged from said nozzle, said motor comprising a casing having a forward end and an open aft end defining a combustion chamber, an aft end adaptor including means for mounting said adaptor on said casing, said adaptor having a central perforation, the surrounding surface of which is a portion of a sphere having its center on the longitudinal axis of said motor, an annular projection on said adaptor extending into said combustion chamber, the radially inwardly facing surface of said projection being a portion of a sphere having its center coincident with said perforation spherical surface center and radially spaced therefrom, a pair of radially extending, spaced apart projections on the external periphery of said nozzle terminating in surfaces which are portions of spheres having centers coincident with said adaptor spherical surfaces and axially positioned in bearing relationship therewith, said adaptor, said spaced apart nozzle projections and said adaptor projection defining an annular fluid chamber therebetween, fluid conduit means connected to said combustion chamber and to said fluid chamber including a pressure amplifier, hydraulic fluid filling said fluid chamber and the amplified pressure side of said conduit, whereby combustion chamber pressure acting on the low pressure side of said amplifier in said conduit means pressurizes said hydraulic fluid in said fluid chamber to provide a forwardly directed balancing force on said nozzle, sealing means between said spaced apart projection and said adaptor spherical surfaces for containing said pressurized hydraulic fluid, and externally mounted actuation means on said nozzle for canting said nozzle with respect to the longitudinal axis of said motor.

2. The motor of claim 1 wherein the sealing means are O rings and said spaced apart projection surfaces include grooves for containing said O rings in sealing relation with said adaptor surfaces.

References Cited

UNITED STATES PATENTS

| | | | |
|---|---|---|---|
| 3,048,010 | 8/1962 | Ledwith | 239—265.35 |
| 3,208,215 | 9/1965 | Brown | 239—265.35 |
| 3,243,124 | 3/1966 | Lee | 239—265.35X |
| 3,302,885 | 2/1967 | Herbert | 239—265.19 |

M. HENSON WOOD, JR., *Primary Examiner.*

H. NATTER, *Assistant Examiner.*